US008612544B2

(12) United States Patent  (10) Patent No.: US 8,612,544 B2
Pasquier et al.  (45) Date of Patent: Dec. 17, 2013

(54) AUDIOVISUAL PROGRAM SYNCHRONIZATION SYSTEM AND METHOD

(75) Inventors: Frédéric Pasquier, Laille (FR); Laurent Lesenne, Acigne (FR)

(73) Assignee: Thomson Licensing (FR)

( * ) Notice: Subject to any disclaimer, the term of this patent is extended or adjusted under 35 U.S.C. 154(b) by 2108 days.

(21) Appl. No.: 10/521,302

(22) PCT Filed: Jun. 27, 2003

(86) PCT No.: PCT/EP03/50273
§ 371 (c)(1),
(2), (4) Date: Dec. 28, 2004

(87) PCT Pub. No.: WO2004/004336
PCT Pub. Date: Jan. 8, 2004

(65) Prior Publication Data
US 2005/0243206 A1    Nov. 3, 2005

(30) Foreign Application Priority Data

Jun. 28, 2002  (FR) ..................................... 02 08091

(51) Int. Cl.
*G06F 15/16* (2006.01)
*H04N 5/932* (2006.01)
*H04N 5/77* (2006.01)
(52) U.S. Cl.
USPC ............ 709/218; 709/217; 386/201; 386/228
(58) Field of Classification Search
USPC ........................................... 709/218; 386/38
See application file for complete search history.

(56) References Cited

U.S. PATENT DOCUMENTS

| 4,230,990 A | 10/1980 | Lert, Jr. et al. |
| 5,485,518 A | 1/1996 | Hunter et al. |

(Continued)

FOREIGN PATENT DOCUMENTS

| EP | 1286541 | 2/2003 |
| JP | 10-191315 | 7/1998 |

(Continued)

OTHER PUBLICATIONS

J. Dakss et al.: "Hyperlinked Video" Proceedings of the SPIE, SPIE, Bellingham, VA, US, vol. 3528, Nov. 1999, pp. 2-10.

(Continued)

*Primary Examiner* — Noel Beharry
(74) *Attorney, Agent, or Firm* — Jack Schwartz and Associates, PLLC

(57) ABSTRACT

The present invention relates in particular to a synchronization system and process. The synchronization system comprises a specification unit for specifying synchronization signals associated with an audiovisual program, the latter comprising an audiovisual content and control information, a recognition unit for recognizing these synchronization signals in a stream carrying this program transmitted via a broadcasting network, by recognizing at least one extracted portion of the audiovisual content, and an activation unit triggering an action in case of detection of these signals. The specification unit prepares and transmits to the recognition unit recognition elements making it possible to obtain this extracted portion, which comprise instructions for extracting the portion of content from at least one stream of an audiovisual program previously received by the recognition unit via the broadcasting network. In variants, the recognition elements are obtained independently of the specification unit. Applications to interactive television and to automatic recordings.

28 Claims, 5 Drawing Sheets

(56) References Cited

U.S. PATENT DOCUMENTS

| | | | |
|---|---|---|---|
| 5,886,995 A | 3/1999 | Arsenault et al. | |
| 7,003,519 B1 | 2/2006 | Biettron et al. | |
| 2002/0056129 A1* | 5/2002 | Blackketter et al. | 725/112 |
| 2003/0233451 A1* | 12/2003 | Ludvig et al. | 709/225 |

FOREIGN PATENT DOCUMENTS

| | | | |
|---|---|---|---|
| WO | WO 01/22279 A1 | 3/2001 | |
| WO | WO 01/60061 | 8/2001 | |
| WO | WO 01/60061 A2 | 8/2001 | |
| WO | WO 01/72040 | 9/2001 | |
| WO | WO 01/80553 A1 | 10/2001 | |
| WO | WO 0221840 A2 * | 3/2002 | H04N 7/173 |

OTHER PUBLICATIONS

Search Report Dated Nov. 19, 2003.

Tanaka, Kiyoshi et al., "LiveWatch: Interactive Live Broadcast System", NTT Cyber Solutions Laboratories, Kanagawa, Japan, ITE Technical Report, The Institute of Image Information and Television Engineers, Oct. 2001, vol. 25, No. 66, pp. 7-12.

* cited by examiner

AUDIOVISUAL PROGRAM SYNCHRONIZATION SYSTEM AND METHOD

This application claims the benefit, under 35 U.S.C. §365 of International Application PCT/EP03/50273, filed Jun. 27, 2003, which was published in accordance with PCT Article 21(2) on Jan. 8, 2004 in English and which claims the benefit of French patent application No. 0208091, filed Jun. 28, 2002.

BACKGROUND OF THE INVENTION

1. Field of the Invention

The present invention concerns a synchronization system and a process for audiovisual programmes, as well associated devices and processes. It pertains in particular to units and to processes for recognizing and specifying synchronization signals.

Interactive television allows a viewer to act on the course of the transmissions that he is watching. He can thus interact with interactive services. To do this, interactive mass-market terminals are connected to a dual communication network:

a bidirectional network (modem return path, cable, etc.) of point-to-point type, such as in particular a telephone network, implementing one or more point-to-point servers, and a unidirectional distribution network, such as in particular a terrestrial, cable or satellite TV transmission network, implementing one or more broadcasting servers; the expression "broadcasting" is understood to mean the transmission of identical data to a set of destinations, whether this transmission be performed in particular by radio transmission, by cable or by Internet.

The terminals considered consist for example of television receivers, of DVB (standing for "Digital Video Broadcasting") decoders or Internet decoders. The interactive services are generally downloaded into the terminals by broadcasting via the unidirectional network. In other cases, they are hosted by servers that can be accessed by the telephone network. These services are then accessed through references or web addresses (also called URLs standing for "Universal Resource Locators", or universal addresses) transmitted as an addition to an audiovisual programme. They determine the server to which the terminals should address themselves as well as the service to be invoked on this server. The audiovisual programmes transmitted synchronously either with the services, or with URLs of the services, are then designated by "enhanced programmes".

2. Description of the Prior Art

In practice, the known techniques of interactive television rely on the operations which follow. An interactive service emanating from a services operator, is transmitted by means of a broadcasting centre, or "broadcaster", in a manner synchronized with an audiovisual programme (unidirectional network). For this purpose, data relating to this service are embedded with audiovisual signals specific to this programme. When an interactive terminal receives the enhanced programme thus obtained, it transmits to the screen (picture and sound) the audiovisual programme and interprets the data of the interactive service. It then screens the latter in synchronization with the audiovisual programme, typically in the form of a graphical or textural display overlaid on the video.

A viewer can then interact with the interactive service, this interaction possibly leading to the setting up of a connection with a server of the services operator (bidirectional network).

One of the essential aspects of interactive television relates to the establishment and the management of synchronization between the programmes and the interactive services data. In particular, provision is generally made to transmit the interactive content or its URL in a loop (carousel) for the duration of the associated audiovisual programme. Two items of equipment of the broadcaster are customarily used for the synchronization:

a traffic system, which creates an events execution list ("playlist") comprising time information (start time and end time), object information (device to be driven) and operation information (command to be executed);

and an automation system, which manages the execution list so as to drive and command the broadcaster's transmission equipment (video servers, video recorders, subtitling apparatus, etc.).

The traffic system makes it possible to make modifications to the execution list in case of significant modifications in the temporal organisation of the programmes. The automation system is for its part capable of rejigging the list in case of last-minute tiny modifications, and of redirecting the list to the traffic system if more consequential modifications are required.

The synchronization of the interactive services with the programmes is obtained by integrating a broadcasting server (which acts as server of interactive applications) among the devices to be driven by the automation system. The service operator is assumed to be connected permanently to the broadcaster's transmission server, so as to be notified of the effective transmission of the programmed contents. This involves a link of the TCP-IP type (standing for <<Transmission Control Protocol/Internetwork Protocol>>) or the like on which a layer of a particular application package may be deployed. This link serves in one direction to programme the transmission server on the basis of administration applications present at the service operator, and in the other direction to inform the services operator in particular of the state of the transmission server, of the progress of transmissions of contents and of any incidents.

Problems of desynchronization between the transmission of the programmes and those of the associated interactive contents are thus avoided. Specifically, if an audiovisual programme is delayed or advanced, the execution list is updated by the broadcaster. In this way, the devices used—including the transmission server—trigger at the appropriate moments.

However, such a technique requires the intervention of the broadcaster, who has to modify his events execution lists to take account of events related to the transmission of interactive services. Moreover, it requires an agreement between the broadcaster and the services operator, so that they concur with regard to commands relating to the transmission of such services.

Various methods have also been proposed in which synchronization signals are inserted into the audiovisual programme itself. Thus, document WO-01/50764 describes a computer process for the utilisation of an interactive digital television transmission, in which service signals corresponding to "synchronization pulse" sequences are detected, which give rise to the downloading of a multimedia application. In U.S. Pat. No. 5,818,440, an interactive application is downloaded into an interactive television network, and this application is automatically enabled upon the detection of an application token incorporated into the video programme.

Such embodiments likewise require the intervention of a transmitter or of a service provider for inserting the stream of appropriate synchronization signals, and therefore have an intrusive nature.

These difficulties are resolved by the intervention disclosed in document WO-01/91462. This priority document describes a device for synchronizing audiovisual programmes transmitted and complementary information. The device comprises an assembly for detecting pictures and/or sounds, which is capable of extracting at least one semantic element from the content of an audiovisual programme currently being transmitted. It also comprises a unit for recognizing these semantic elements, which is linked to a programme guide which comprises a chronologically ordered list of information sets associated with the audiovisual programmes. The recognition unit, prepared by prior learning, selects the information set which is most probably correlated with these semantic elements. A synthesis block then synchronizes the audiovisual programmes with the information sets selected.

However, this invention necessitates complex means and requires reference to a programme guide.

Patent application WO-02/21840 proposes a method of synchronizing a client with a media signal. According to one embodiment of this method, one or more actions corresponding to an audiovisual signal (the media signal) is or are received, an application for performing the actions (for example by syntactic analysis—or "parsing" —of action information) is determined, and an enabling of the actions is triggered by this application. In the examples described, an operator defines actions that he despatches to a server, which itself transmits them by broadcasting via Internet to clients. Either the actions despatched have to be executed upon receipt, or they are accompanied by temporal information which makes it possible to determine the moments at which to execute them.

A drawback of this method is that it necessitates relatively complex operations for the synchronization, either in the form of interventions of an operator at the requisite moments, or in the form of a prior preparation making it possible to trigger the despatches of the actions at the opportune moments.

Document WO-01/82623 discloses the automatic insertion of interactive TV triggering messages ("triggers") into a stream of audiovisual data. The insertion can in particular be based on the recognition of particular elements in the stream, such as audio/video samples stored in a database. Moreover, this insertion may be triggered before or after broadcasting the stream. The description also mentions the use of a tagging table comprising relations between on the one hand the samples to be found, and on the other hand interactive elements and associated attributes, such as for example the station number.

However, this very flexible technology presupposes prior acquisition of the recognition elements, which have to be made available for the automatic insertion system. But, the priority document WO-01/82623 does not describe the mode of obtaining these elements. A person skilled in the art seeking to implement such acquisition could then envisage several methods.

A first method of acquisition would apply in the case of an insertion of the triggers upstream of the broadcasting. An operator would view the programmes concerned in advance, would select significant elements to be recognized and would record them in a base accessible directly by the automatic insertion system. This type of embodiment is however restricted to insertions of triggers before broadcasting, and involves tight communication between the operator and the broadcaster.

A second method of acquisition would consist in recording the recognition elements in a portable storage medium, such as for example a cassette, a hard disc or a DVD (standing for "Digital Versatile Disc"), then in making the medium available to the user of the automatic insertion system. This method has with respect to the first the advantage of being applicable in a broader context, and can theoretically be utilized not only by a broadcaster, not necessarily benefiting from immediate access to storage resources common with the operator, but also by an end user of a video decoder. However, it constrains storage media to material transmissions and does not permit flexible modifications of the recognition elements. Its practical field of application therefore also turns out to be fairly restricted.

A third method of acquisition would consist in transmitting the recognition elements by teletransmission, via a communications network. This solution, which offers great flexibility and makes it possible to utilize a system of automatic insertion both upstream and downstream of the broadcasting, is however penalised by the transmission resource requirements. Indeed, to be significant, the recognition elements are in numerous cases at risk of being relatively voluminous, pertaining to portions of audiovisual contents. Their transmission then entails significant costs in terms of bandwidth, encroaching on the communication resources. For example, to transmit complete pictures in an analogue television environment, a bandwidth of only a few tens of k-bytes/second is available.

SUMMARY OF THE INVENTION

The present invention relates to a system and a process for synchronizing audiovisual programmes and interactive services, able to make it possible to be entirely unintrusive with regard to broadcasters and service operators, while permitting simple and reliable implementation and avoiding recourse to a programme guide. The system and the process of the invention make wide applications possible, both upstream and downstream of the broadcasting of the programmes, flexibly modifiable, and without penalising the resources in terms of communications bandwidth.

The synchronization system and process of the invention apply also to other types of synchronization relating to audiovisual programmes, in particular for automatic recordings of films or transmissions, or automatic substitutions of audiovisual programme contents (the user being for example able to decide in advance a real-time replacement on the screen of a certain category of programmes by another, by means of a selection from among several transmission sources). What is more, they also relate to radio transmissions. Subsequently and for simplicity, including in the definition of the invention, the expression "audiovisual programme" encompasses audio and/or video programmes.

A subject of the invention is also units and processes for specifying and recognizing synchronization signals, useable for the synchronization system of the invention and able to offer the aforesaid advantages.

It also encompasses a broadcasting centre (broadcaster), a service operator, a terminal (interactive or otherwise) for receiving audiovisual programmes and software, that are associated with one at least of the aforementioned subjects of the invention.

To this end, a subject of the invention is a recognition unit for recognizing synchronization signals in at least one audiovisual programme received, the said audiovisual programme comprising an audiovisual content intended to be transmitted (that is to say embodied in visual or auditory form) to users and control information. The recognition unit is in accordance with Claim 1.

The recognition unit of the invention is therefore capable of detecting synchronization signals without any modification being made to the audiovisual programmes, by direct analysis of the audiovisual content (such as pictures, sounds, parts of the latter or combinations) transmitted to the users. Thus, by contrast with the intrusive processes consisting in intervening on the events execution lists, no modification of these lists is required. The risks of transmitting an interactive service on an audiovisual programme that would not correspond are in particular reduced in this way. Specifically, by virtue of the recognition pertaining to the content, an error has a low possibility of occurring, while with the above processes, these risks are considerably increased through the manipulation of identification entities and the presence of a third party providing information unverifiable by the service operator (identifier of the programme).

Moreover, in contradistinction to the techniques relying on the recognition of specific detection signals incorporated into the streams of audiovisual programmes transmitted, no action on the signals carrying these programmes is necessary.

What is more, with respect to the technique disclosed in patent application WO-01/91462, the recognition elements are previously communicated to the recognition unit, thereby making it possible to avoid recourse to complex identification techniques associated with a programme guide.

Moreover, the recognition unit of the invention contrasts with the teaching of the priority document WO-01/82623 through the mode of obtaining the recognition elements. While this document remains silent as to the means of acquisition to be implemented, and whilst a person skilled in the art would adopt one of the solutions mentioned above, the present recognition unit is capable of exploiting a prior transmission of an audiovisual programme via the broadcasting network. The module for receiving the transmitted streams is then utilized as part of the module for receiving recognition elements.

Thus, the information to be transmitted specifically for the acquisition of the portions of audiovisual content may be reduced to complementary data pertaining to the procedures for extracting these portions (channel, date, type of data, etc.). The recognition unit can thus aggregate wide range of application, flexibility and small quantity of bandwidth required.

The implementation of the invention presupposes however that the content portion used is transmitted in an audiovisual programme, prior to the programme onto which the synchronization is to be locked. This constraint, which may appear fairly restrictive, turns out in practice to be verifiable in a very large number of cases. Specifically, the content portion can be extracted in particular from transmission credits or serial credits or from an advertising pattern (for example advertising banner), which are transmitted periodically. Furthermore, the accuracy in the instant of acquisition of the picture or of the sound to be recorded is not generally paramount. In fact, a determined sequence, of which any extracted portion whatsoever able to serve for tagging is suitable, is adhered to in the usual cases cited hereinabove.

Moreover, the recognition unit of the invention advantageously includes timeout capabilities, made explicit hereinbelow, which make it possible to trigger actions after predefined durations following the moment of detection in a programme of the portion of content. Thus, any moment whatsoever of a transmission may form the subject of a synchronized operation, in so far as determined initial instants of this transmission (or earlier instants prior to this transmission) may be located.

In regard to the known techniques and methods seeming fairly logically to apply to the acquisition of recognition elements, the utilisation of programmes previously transmitted via the broadcasting network appears particularly surprising. One would in fact expect that the whole set of information required for the detection of the synchronization signals, including the portions of content to be identified, would be made available in a specific and grouped manner. By contrast, here the portions of contents are not communicated or accessible explicitly and specifically, but incidentally and implicitly through a transmission not dedicated to synchronization.

In the definition of the recognition unit, as in the remainder of the application, the "units" and "modules" are to be understood in a functional sense, and are therefore not limited to particular embodiments. Thus, they may in particular be grouped together within one and the same component or one and the same software, or on the contrary be distributed among various components. Furthermore, the recognition unit may be installed on the transmission side (typically at the broadcaster), service operator side, or, in an embedded form, in a, preferably interactive, terminal for receiving audiovisual programmes.

The recognition elements received and/or the portions extracted may apply to one or more programmes, transmitted simultaneously or successively. For example, programmes being recurrent in time, it suffices to acquire pictures once only in order for a synchronization to be effectively programmed.

According to various procedures of the extraction instructions used by the recognition unit for a given type of detection:
  the instructions pertain to a complete picture, on the basis of which the detection must be performed;
  the instructions pertain to a sub-picture; the recognition elements then contain the coordinates of a zone to be detected; this solution is less expensive in resources than the previous one, both in terms of storage and processing time required for detection;
  the instructions pertain to a group of pictures or of parts of pictures; by way of examples, the triggering of an action is then dependent on the detection of all the entities of the group, or on the contrary on the detection of at least one of them;
  the instructions pertain to a set of sounds transmitted for a determined duration.

In general, each of the portions of content preferably consists of at least one of the following portions: a picture, a sound and any combination of at least two of these portions.

Preferably, the module for receiving the recognition elements is designed to receive a triggering message (trigger) and the recording module is designed to extract and record upon receipt of the said triggering message, the portion of the previously received stream. The use of such a trigger is particularly effective and simple to implement. Moreover, the trigger is advantageously a triggering message of particular type, indicating the type of portion of content to be extracted and the intended channel. In a variant, this information has been despatched previously. As indicated above, high accuracy in the synchronization of this recording of portion is not generally necessary.

According to an improved embodiment of the recognition unit, the module for receiving the recognition elements is also designed to receive among the recognition elements, at least one identifier of the extracted portion, and the detection module is capable of retrieving from the storage space the previously recorded extracted portion associated with the said identifier, so as to recognize in the content of the audiovisual programme received that extracted portion.

This embodiment makes it possible in particular to avoid multiple operations of extractions (saving of local resources) or of transmissions (saving of bandwidth) of one and the same extracted portion, having once accomplished the initial step of acquisition of this portion. Moreover, including in the case of single use of an extracted portion, it makes it possible to anticipate with regard to later recognition instructions. Specifically, it may happen that a sequence that is significant in respect of detection is transmitted in a programme, without the precise usage that will be made thereof subsequently having yet been precisely established (for example, the utilization procedures in respect of interactivity are not yet known).

The later recognition elements specifying the utilisation of the recorded portion may comprise recognition data such as in particular time slot, transmission channel and/or Boolean operator, possibly accompanied by action information and/or timeout information. Thus, the recognition elements in their entirety are advantageously obtained in at least two successive steps: instructions for extracting portions of contents, followed by instructions for utilising these portions (these portions may or may not already have been acquired during the receipt of the utilization instructions).

In a particular form of this embodiment with portion identifier, the reception and recording modules are able to receive and store extracted portions utilisable for several distinct types of detection. Each portion or set of portions is then specified by a one-to-one portion identifier, utilisable by the various types of detection. This plurality of detection types is able to afford at one and the same time flexibility and complexity in the synchronization operations in a simple manner.

Advantageously, the module for receiving the recognition elements is also capable of receiving directly the extracted portion among the recognition elements and the recording module is designed to record that extracted portion in the storage space.

This functionality, that may be expensive in terms of bandwidth, is thus integrated, but by way of replacement solution when the prior extraction from a transmitted programme is not possible. In certain cases, specifically, it is not proven possible to identify any programme transmitted in advance from which it will be possible to extract an appropriate pattern with a view to a desired later detection. The existence of this option affords a very advantageous global system, through its capacity to cover the whole set of situations while preserving (for a good number of these situations) the plus of a considerable potential reduction in required bandwidth.

These latter advantages combined are particularly beneficial if the recognition unit is implemented in a terminal, or more generally downstream of an extensive communication network designed to support the transport of the extracted portions.

According to a preferred embodiment, the recognition unit groups together the capabilities of the three types of acquisition of portions of contents mentioned above:

- extraction of the portion of content from at least one stream of an audiovisual programme previously received by the stream reception module, according to extraction instructions included in the recognition elements;
- direct transmission to the recognition unit, of the content portion included in the recognition elements; the extracted portions are advantageously transmitted by a specific unit (such as that defined hereinbelow as "specification unit");
- and retrieval in storage space of the content portion, on the basis of an extracted-portion identifier included in the recognition elements.

Preferably, the recognition unit also comprises a timeout module before despatch of the action instructions by the transmission module.

The timeout module introduces a lag before the transmission of the action instructions when the synchronization signals are detected in the audiovisual programme. The use of this lag is particularly beneficial, in so far as it makes it possible to lock the synchronization onto an event that can be anticipated, and then to meter the time mismatch between this synchronization and one or more opportune moments, so as to trigger at these moments the actions to be synchronized. Moreover, the utilisation of the lag considerably favours the acquisition of the portion of content on the basis of a programme transmitted previously. Specifically, it makes it possible to lock onto a sequence designed to be repeated during successive transmissions, such as credits.

Thus, in particular, a live transmission generally being preceded—or even punctuated—by advertising, it is possible to lock the detection onto credits at the end of an advertising banner (previously recorded on the basis of an earlier transmission) and to adjust the timeout so that an interactive service is displayed for example 10 minutes after the commencement of the transmission (by way of illustration, the time for a promoter to announce the possibility of interacting with his television set).

This technique may in particular allow a service operator to manage synchronization operations, including with regard to transmissions transmitted live, without having to request a station transmitting the transmissions to be an active party to these operations. It is in fact sufficient for the station to provide a mode of acquisition of a sample, such as for example a picture of an advertising banner, and an approximate timing for the triggering of desired actions, for example the appearance of interactivity. This embodiment permits in particular synchronization of the transmission of interactive services, with audiovisual programmes that are designed a priori without any interactivity.

To a given detection of synchronization elements, there may correspond several timeouts defining successive instants. The timeout and transmission modules are then able to use a detection instant as a reference time, from which the timeout module determines several instants for triggering dispatching of action instructions. In a sophisticated version, the timeout module is able to combine more complex information than a single detection instant and predefined durations to determine these triggering instants. Such information may in particular consist of:

- several detection instants (for example two detection instants serve to specify at least three instants for triggering dispatching of instructions);
- operators pertaining to the synchronization signals detected (for example, distinct extracted portions are associated respectively with various groups of lags);
- detection time slots (for example the lags are shorter if the detections are performed during later time slots);
- or any combination of the above information.

Preferably, the modules for receiving and for recording the recognition elements in the recognition unit are designed to respectively receive and record also at least one timeout lag and the timeout module is designed to use this lag. According to other embodiments, the lag is predefined, or determined locally by the user.

Advantageously, the modules for receiving and for recording recognition elements and the module for transmitting action instructions are designed to respectively receive, record and transmit identifiers relating to the actions to be triggered. The recognition criteria and the actions to be performed are thus specified at one and the same time.

In a preferred form of communication of action identifiers, recognition elements and action identifiers are received jointly in the form of pairs, each of these pairs comprising a set of recognition elements and an associated identifier of actions.

In other embodiments, the action identifiers are received separately and are applied to all the detections subsequently performed with the successively transmitted recognition elements. In yet other embodiments, the actions to be triggered are predefined, or decided by users independently of the recognition operations.

In a first advantageous form of the recognition elements, the latter include at least one Boolean operator. The detection module is designed to detect at least two of the portions of content in conjunction with this Boolean operator (such as, in particular, "and" or "or") and the transmission module is designed to transmit the action instructions in case of such detection.

For example, identifications associated with action identifiers are combined in the following manner:
if (picture 1 detection AND picture 2 detection), then trigger action 1,
if (picture 3 detection OR picture 4 detection), then trigger action 2.

In a second advantageous form of the recognition elements, the latter include at least one time information item. The detection module is then designed to detect the portions of content in conjunction with this time information item and the transmission module is designed to transmit the action instructions in case of such detection. Preferably, this time information item comprises at least one information item chosen from among a date of detection and a detection time slot.

For example, the detection of the portions of contents is combined with tests on the current date:
if (picture 1 detection AND picture 2 detection), then trigger service 1,
if (picture 3 detection AND current_date( )=06092002), then trigger recording.

Particularly beneficial embodiments of the recognition elements carrying time information relate to the delimitation of the activation period for the detection of the portions of content.

For example, a detection start date/time and end date/time is indicated for each detection, thereby making it possible to restrict the number of comparisons to be performed for each recognition element received. This technique is in particular beneficial for the transmission of interactive services. Specifically, the transmission time of an audiovisual programme is generally known to within a few minutes and only a single service is transmitted at one and the same time, so that the programming of a single detection at a given instant is sufficient to trigger the transmission of this service.

According to other features (advantageously combined):
the search commences immediately after the acquisition of the portion according to the extraction instructions, and ceases at a certain date indicated in the recognition elements;
the search commences under the effect of a start trigger and ceases under the effect of an end trigger, these start and end triggers preferably referring to the type of detection intended, by means of at least one extracted-portion identifier;
and/or the search is activated and/or deactivated by the detection of at least one auxiliary content portion; this auxiliary portion may be chosen to be much smaller than the main content portion (for example advertising logo), thereby rendering this solution fairly beneficial for restricting the CPU operations (CPU standing for <<Central Processing Unit>>) necessary.

In a third advantageous form of the recognition elements, the latter include at least one channel reference. The detection module is then designed to detect the portions of content in conjunction with this channel reference and the transmission module is designed to transmit the action instructions in the case of such detection.

By transmitting an information item regarding the station on which detection should be done, one avoids unnecessarily invoking the recognition unit when no detection is programmed on the current station. This extra information item also makes it possible to program detection on a station in particular, the recognition element to be detected possibly being broadcast on several stations—for example a commercial break. By default and without any information as to station, the detection is preferably activated permanently and without distinction of station.

In advantageous embodiments, the detection of the synchronization signals relies on the recognition of several portions of content, or on the cross checking of recognition of such portions with other types of information (station, variable of the system such as the current date, possibly programme guide, etc.). Thus, several pictures are advantageously used in case of uncertainty as regards the content of the programme or so as to multiply the chances of detecting the programme, the detection of one of the pictures triggering the action procedure.

The invention also relates to a specification unit for specifying synchronization signals associated with at least one audiovisual programme, the said audiovisual programme(s) comprising an audiovisual content intended to be transmitted to users and control information, and the synchronization signals being intended to be detected in at least one transmitted stream carrying the said audiovisual programme transmitted via a broadcasting network and to thus trigger at least one action.

According to the invention, the specification unit comprises:
a preparation module for preparing recognition elements making it possible to obtain at least one extracted portion of the content of the audiovisual programme,
and a transmission module for transmitting the recognition elements independently of transmissions of the audiovisual programme, to at least one recognition unit intended to detect the synchronization signals in the transmitted stream carrying the audiovisual programme, by recognizing the extracted portion(s) in the content of the audiovisual programme.

The preparation and transmission modules of the said specification unit are designed respectively to prepare and transmit extraction instructions, in at least one stream of an audiovisual programme previously received by the recognition unit via the broadcasting network, for extracting the portion of content.

This specification unit is preferably capable of cooperating with any one of the embodiments of the recognition unit of the invention.

Preferably, the preparation and transmission modules of this specification unit are designed respectively to prepare and transmit identifiers relating to the actions to be triggered in case of detection of the synchronization signals.

The action identifiers then advantageously relate to at least one of the following actions: transmission of an interactive service, triggering of an interactive service, triggering of an update of an interactive service, triggering of a recording of the audiovisual programme and connection to a website. The first action is more specifically intended for a detection of synchronization signals at the level of a broadcaster or of a services operator, while the last three actions are typically applicable in the case where the recognition is performed in a terminal for receiving audiovisual programmes (for example triggering of an embedded service, possibly consisting in the triggering of its appearance).

According to advantageous embodiments relating to the obtaining of the extracted portion:
the preparation and transmission modules are such that the recognition elements may include this extracted portion; and/or the preparation and transmission modules are such that the recognition elements may include at least one identifier of this extracted portion previously recorded in the storage space.

The invention applies also to a synchronization system as defined in Claim 15, comprising a specification unit for specifying synchronization signals, a recognition unit for recognizing the synchronization signals, and an activation unit designed to trigger at least one action in the case of detection of the synchronization signals by the recognition unit.

The recognition unit and/or the specification unit are preferably in accordance with any one of the embodiments of the invention.

The subjects of the invention are also a broadcasting centre, a services operator and a terminal for receiving audiovisual programmes, comprising a specification module, a recognition module, and/or a synchronization system which are in accordance with any one of the embodiments of the invention.

In the case where the recognition unit is in a reception terminal, according to an advantageous implementation, recognition elements and associated interactive services are advantageously transmitted in phase advance to the terminal. When, for example, the viewers are offered no interactivity, this makes it possible to increase the proportion of televisions capable of offering interactivity. The terminal then preferably has means for storing the recognition elements, extracted portions and interactive services in the permanent memory, for example of flash type. This embodiment makes it possible to program continuing synchronizations with switch offs and switch ons of the terminal. In this way, the chances of offering interactivity are increased despite a complete provisional shutdown of the system.

In a first mode of dispatching the recognition elements and associated services to a terminal comprising a recognition unit, one or more associations of sets of recognition elements and of corresponding interactive services are transmitted jointly (in phase advance), preferably by broadcasting. The dispatching of several associations of this type which are intended to be utilized in parallel is completed by communicating action identifiers coupled to the sets of elements, these identifiers indicating which services are the ones to be instigated.

In a second mode of dispatching the recognition elements and associated services to a terminal comprising a recognition unit, the dispatching of the recognition elements and of the services is separated. Action identifiers are then attached to the recognition elements so as to make the latter correspond to the services to be instigated.

The invention also relates to a process for activation by recognition of synchronization signals in at least one audiovisual programme received, in accordance with Claim 19. This recognition process is preferably implemented by means of a recognition unit in accordance with any one of the forms of the invention.

The invention moreover relates to a specification process for specifying synchronization signals and a synchronization process which are respectively in accordance with Claims 20 and 21. These methods are preferably implemented respectively by means of a specification unit and a synchronization system which are in accordance with any one of the forms of the invention.

The subject of the invention is also a computer program product, characterized in that it comprises program code instructions for the execution of the steps of one of the processes according to the invention when this program is executed on a computer. The expression "computer program product" is understood to mean a computer program support that can consist not only of a storage space containing the program, such as a diskette or a cassette, but also of a signal, such as an electrical or optical signal.

BRIEF DESCRIPTION OF THE DRAWINGS

The invention will be better understood and illustrated by means of the following wholly nonlimiting exemplary embodiments and implementations, with reference to the appended figures in which.

DETAILED DESCRIPTION OF PREFERRED EMBODIMENTS

Figure 1:
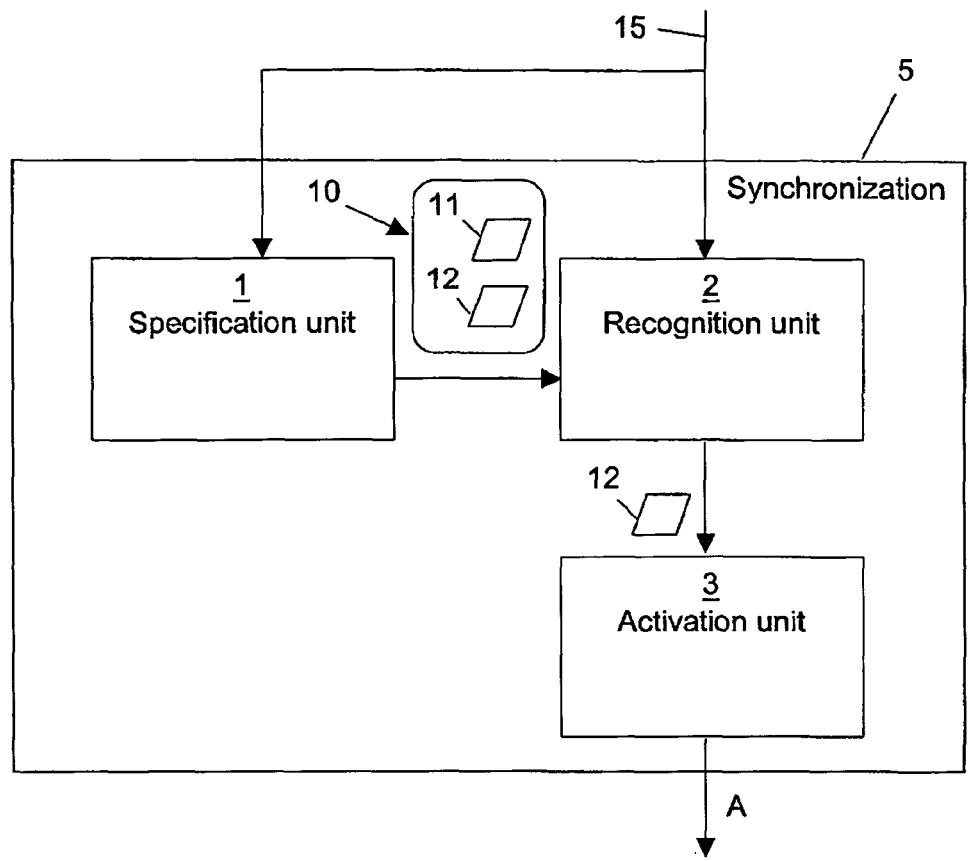
FIG. 1 is a basic diagram of a synchronization system in accordance with the invention.

A synchronization system 5 (FIG. 1) is designed to synchronize audiovisual programmes 15 and interactive services S. It comprises a synchronization signals specification unit 1, able to prepare pairs 10 each consisting of a set of recognition elements 11 and of an action identifier 12, from audiovisual programmes 15 and selection operations performed by a user, before transmission of the programmes 15 over a network. In each of these pairs 10, the recognition elements 11 include at least one extracted portion of the content of the programme 15, which portion is intended to serve as synchronization signal (at least partial), or extraction instructions for extracting this portion in a programme transmitted earlier to the programme which is subject to the synchronization. The action identifiers 12 of each of the pairs 10 contain information relating to the execution of actions in case of detection of such synchronization signals in the streams carrying the programmes 15.

A recognition unit 2 is designed to record the pairs 10 originating from the specification unit 1, to use them upon receipt of streams carrying the programmes 15 so as to recognize the portions of content in the programmes and, under the conditions defined by the sets of recognition elements 11, to identify occurrences of synchronization. It is also intended to transmit the action identifiers 12 for triggering of these actions, in case of detections of identification signals corresponding to these actions.

An activation unit 3 is designed to receive the action identifiers 12 originating from the recognition unit 2 and to trigger the appropriate actions A.

Figure 2:
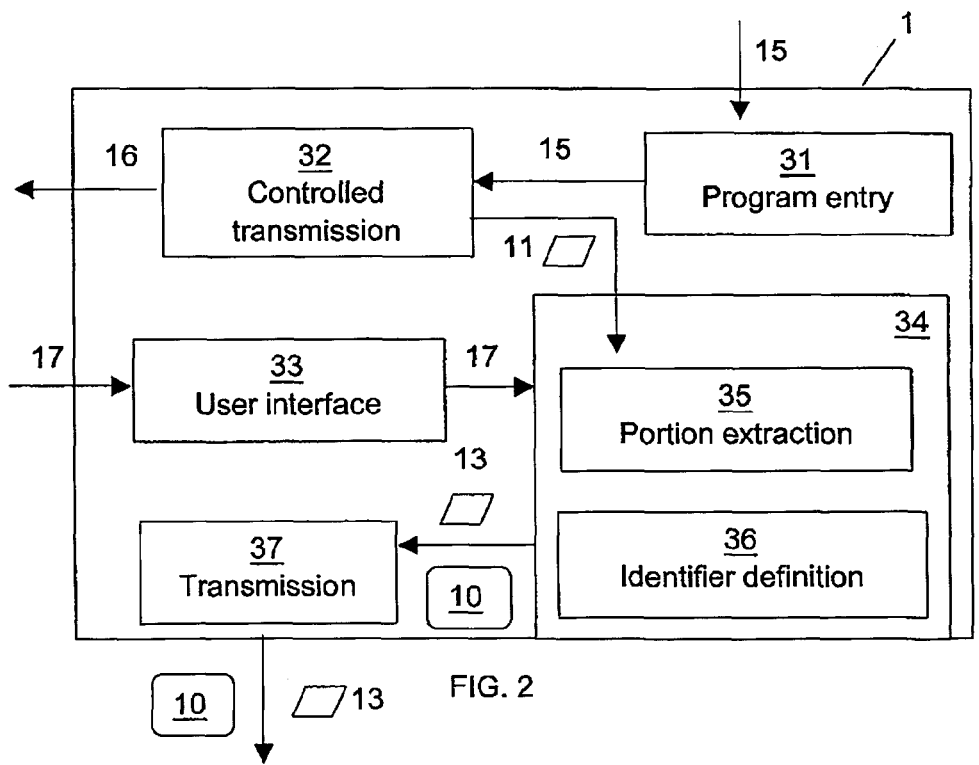
FIG. 2 represents a specification unit of the synchronization system of FIG. 1.
Figure 3:
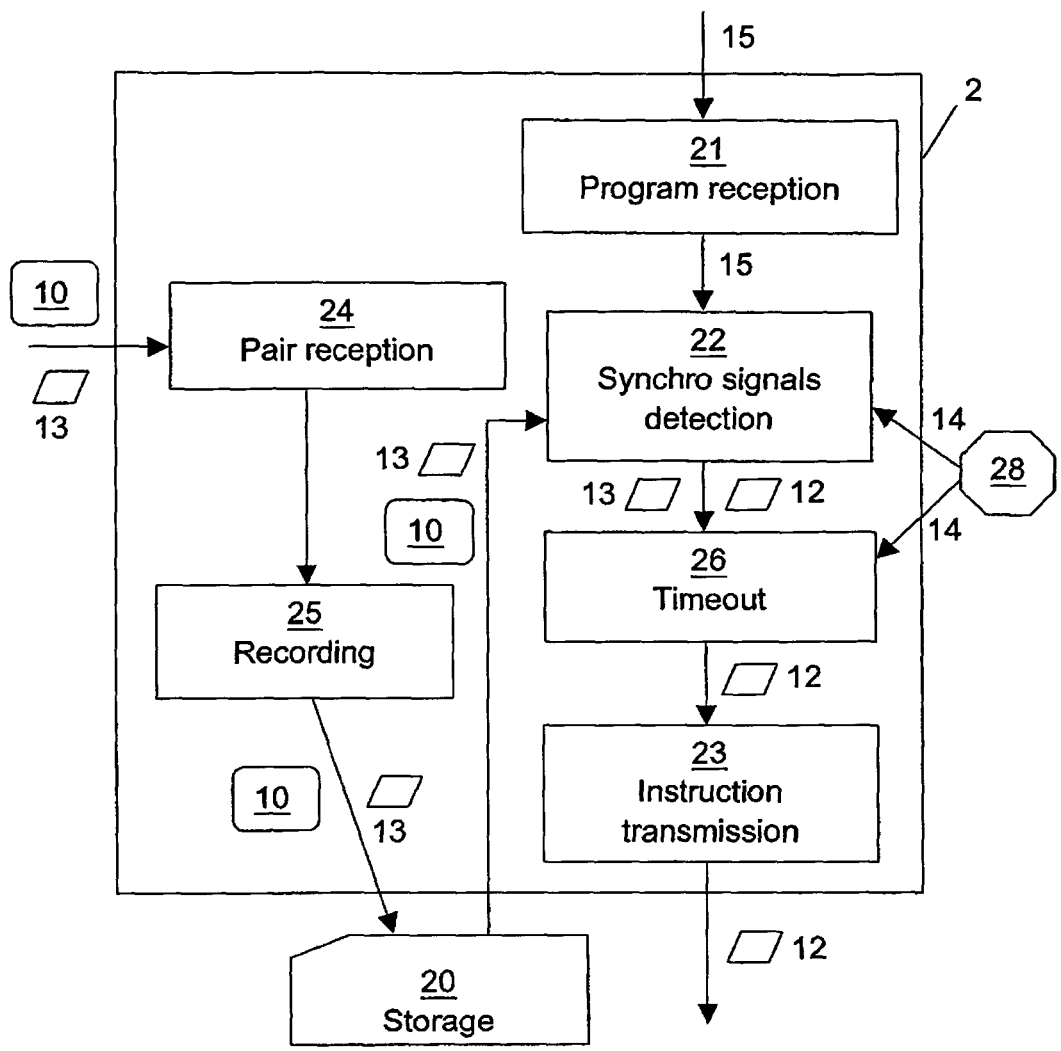
FIG. 3 represents a recognition unit of the synchronization system of FIG. 1.
Figure 4:
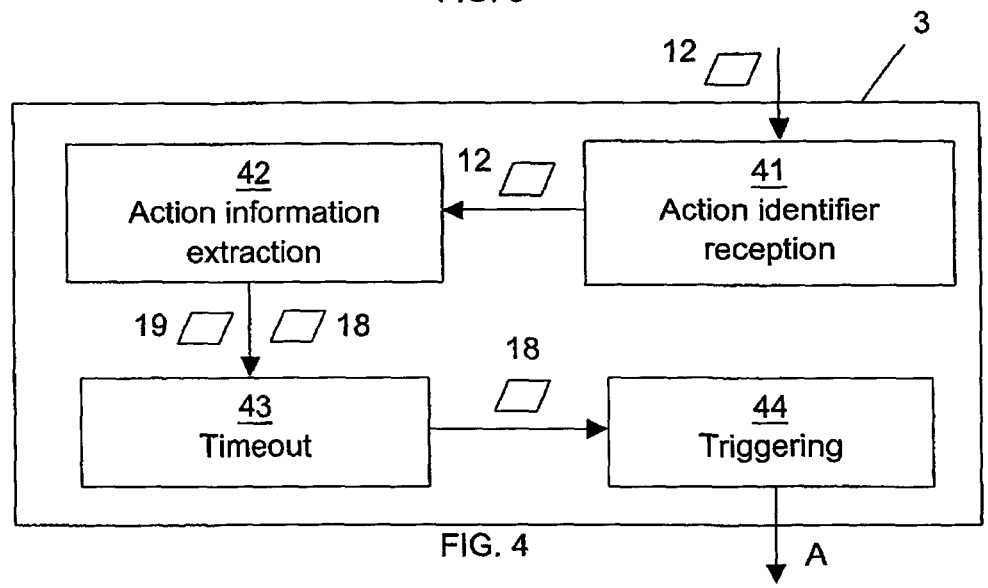
FIG. 4 represents an activation unit of the synchronization system of FIG. 1.

The three units 1, 2 and 3 of the synchronization system will now be detailed, with reference respectively to FIGS. 2, 3 and 4. The specification unit 1 (FIG. 2) comprises an input module 31 for the audiovisual programmes 15 or associated audiovisual programmes for synchronization and a module 32 for controlled transmission to an operator of contents 16 of these programmes. The latter, or at least significant parts of these programmes (picture, sound, colour of a banner, etc.), are for this purpose available in phase advance for the operator responsible for programming the synchronization system 5. Typically, the latter has available a recording on cassette or DVD, or a sequence intended to be inserted into a transmission. The operator can, for example, view one of the programmes 15 picture by picture, or listen to certain passages of sound.

A user interface 33 of the specification unit 1 allows the operator to input commands 17 in conjunction with this controlled transmission. It permits the operator to select pictures, sounds, parts of pictures or combinations of these portions of content, so as to include in the recognition elements 11:
  either the portions themselves,
  or instructions for extracting these portions from a (or several) audiovisual programme(s) transmitted before the programme 15,
  or identifiers of these portions.

The interface 33 also allows him to define more complex recognition criteria, based on conjunctions or alternatives (respectively: several portions, or at least one portion from several, to be recognized), time criteria (date, time slot) or stations. The interface 33 also allows the operator to define action identifiers 12 associated with the recognition elements 11, such as the triggering or the transmission of an identified interactive service, and timeout lags, between the detecting of synchronization signals and the triggering of corresponding actions. Such lags are:
  either transmitted separately in the form of lags 13 designed for a timeout between a detection by the recognition unit 2 and a transmission of the action identifiers 12 to the activation unit 3,
  or incorporated into the action identifiers 12 for timeout between their reception by the activation unit 3 and the triggering of the corresponding actions A.

The joint use of the two types of lags is also possible.

A preparation module 34 establishes the pairs 10 and the lags 13 as a function of the operator's commands and communicates them to a transmission module 37 for transmission to the recognition unit 2. This preparation module 34 comprises in particular a submodule 35 for extracting the portions selected from the programmes viewed and a submodule 36 for defining the action identifiers 12.

The recognition unit 2 (FIG. 3) comprises for its part a reception module 21 for receiving the audiovisual programmes (in particular the programmes 15) and a reception module 24 for receiving the information originating from the specification unit 1, including the pairs 10 and the timeout lags 13. A recording module 25 makes it possible to automatically record this information in a storage space 20.

The recognition unit 2 also comprises a synchronization signals detection module 22 intended in particular for comparing the contents of the programmes 15 with the portions of contents obtained by means of the recognition elements 11 and stored in the storage space 20. The detection module 22 is in conjunction with the information sources capable of serving for the identification of the selection criteria, for example a clock 28 providing time information in case of time criteria (date, time span). The detection module 22 is designed to communicate the action identifiers 12 and the associated timeout lags 13 as they are in case of detection of the synchronization signals, to a transmission module 23 for transmitting instructions via a timeout module 26. The function of the latter is to possibly timeout the transmission in the presence of timeout lags 13, while the transmission module 23 is intended to transmit the action identifiers 12 to the activation unit 3 as they are.

As indicated above, the interface 33 and the preparation module 34 of the specification unit 1 allow the operator to formulate information included in the recognition elements 11, which allows the recognition unit 2 to identify and obtain the portions of contents via the module 21 for receiving the audiovisual programmes.

This information may in particular consist of a channel and a schedule, this schedule possibly being replaced with an instantaneous-selection indicator. The information may be despatched in the form of triggers, designed to trigger at the level of the recognition unit 2 the extraction and the recording of the intended portions. In a variant of acquisition of the portions of content, it is the presence of a pattern (sound and/or picture) in a programme transmitted on a given channel and in a determined time slot, which triggers after a predefined lag the extraction and recording operations.

For example, one wishes to effect an automatic recording of all the episodes of a series. But, this series is always preceded by the same credits, that last around one minute. The first episode of the series should be shown around 3 minutes after an end of advertisement page, a representative picture portion of which is already stored as reference. Initially, the recording of the first episode is thus effected, by defining precisely the station and the time slot, and by envisaging the triggering of the recording 2 minutes (for safety) after the detection of the advertising picture portion.

In parallel, one triggers an extraction and a recording of a picture transmitted on the station, 3 minutes 30 after this same detection. This picture, which forms part of the credits for the series (a verification is possible), is then itself used as extracted reference portion for the detection of the following episodes. A systematic recording of the duration of an episode is thus triggered as soon as this picture is detected on the transmission channel. According to variants or improved versions:
  end of episode credits are used to trigger the end of the recording;
  several pictures from the opening credits, staggered over time, are used to validate the triggering of the recording, so as to reduce the risk of recording caused by a trailer;

the picture recognition is cross-checked with a programme guide, so as to limit the standby periods and reduce the risks of untimely recording.

The recording module 25 of the recognition unit 2 is then capable of proceeding to the recording of the extracted portions as a function of the information transmitted by the specification unit 1, without these portions having had to travel between the specification unit 1 and the recognition unit 2.

The activation unit 3 (FIG. 4) comprises a reception module 41 for receiving the action identifiers 12, a module for extracting action information from these identifiers 12, and for transmitting action instructions 18 and timeout lags 19, if any, to an action triggering module 44, via a timeout module 43. The function of the latter is to timeout the transmission of the action instructions 18 as they are, according to the timeout lags 19. The job of the triggering module 44 is to trigger the actions A targeted by the action instructions 18, as soon as the latter are received.

Figure 5:
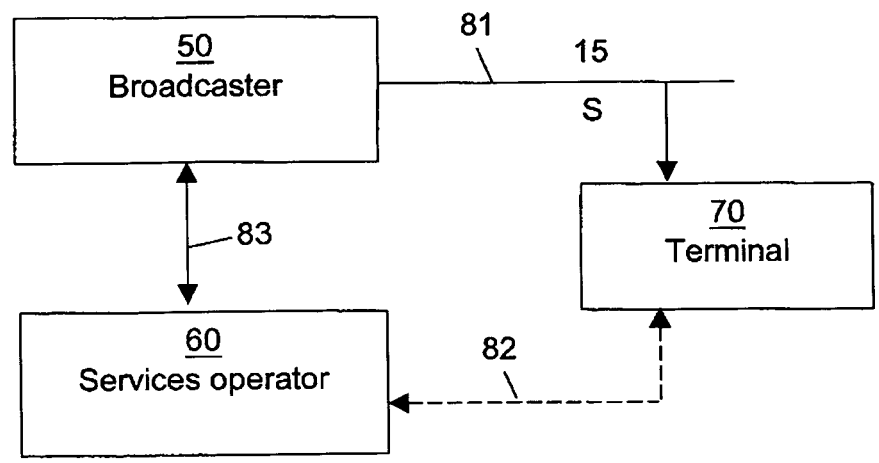
FIG. 5 diagrammatically illustrates a communication network comprising a broadcasting centre (or broadcaster) together with a transmission server, a services operator together with point-to-point server and a mass-market terminal, interactive or otherwise.

The synchronization system 5 will now be set forth in several practical applications of interactive television, involving a communication network (FIG. 5) which comprises a broadcaster 50, a services operator 60 and a mass-market interactive terminal 70. The broadcaster 50 is linked to terminals of the type of the terminal 70, by a mono-directional network 81 (an RF, cable or satellite TV transmission network). The services operator 60 may or may not be linked to the terminal 70, by a bi-directional network 82 (modem return path, cable, etc.) of point-to-point type, such as the telephone network. The broadcaster 50 and the services operator 60 are, for example, connected to one another by a link 83 of the TCP-IP type, on which a bus in accordance with the CORBA (standing for Common Object Request Broker Architecture) standard is deployed.

Figure 6:
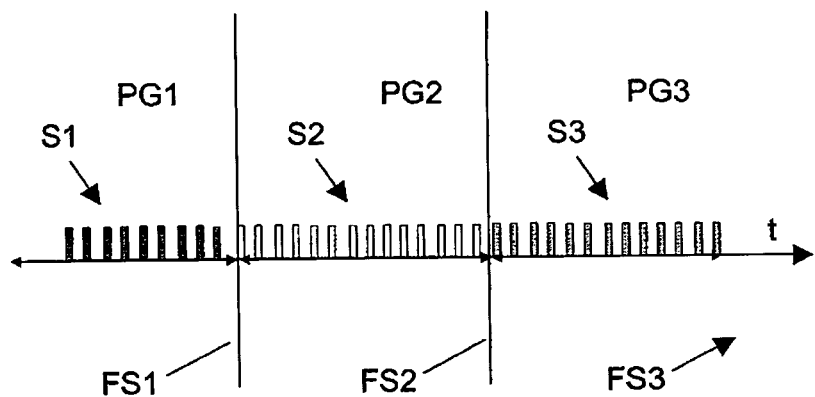
FIG. 6 shows the time profile of a carousel transmission of services.

It is envisaged that the broadcaster 50 transmits in a loop (carousel) interactive contents or their URLs, called interactive services S for simplicity, for the duration of the associated audiovisual programmes 15. In an operational example (FIG. 6), the broadcaster 50 transmits successively in the course of the time t the services S1, S2 and S3 in a loop, jointly with the respective enhanced programmes PG1, PG2 and PG3, until instants of end of availability FS1, FS2 and FS3 of the services S.

In a first embodiment (FIG. 7), the synchronization system 5 is installed in a computer 62 of the services operator 60 and is controlled by an operator 61 via a network 84. When operational with extraction of portions of contents, the following may be carried out:

Step 1: programming of the specification unit 1 of the synchronization system 5, by locking onto a station where an audiovisual programme is to be transmitted prior to the programme 15 and comprising an identical reference pattern, or onto information relating to the programmes of this station (such as a programme guide); definition of pictures and/or sounds to be detected associated with this pattern, and specification of the recognition elements 11 including instructions for extracting these pictures and/or sounds and the action identifier 12 to be despatched;

Step 2: transmission by the broadcaster 50 of the prior audiovisual programme, receipt of this programme by the synchronization system 5, application of the extraction instructions for extracting from this programme the pictures and/or sounds to be detected, and recording;

Step 3: when the moment of transmitting the programme 15 has arrived, a video server or a video recorder of the broadcaster 50 commences the transmission of the audiovisual programme 15;

Step 4: transmission of the audiovisual programme 15 alone (via transmission relays 56);

Step 5: the synchronization system 5 then receives the audiovisual programme 15 pictures with which it has to synchronize an interactive service S and analyses them;

Step 6: when the programmed pictures and/or sounds are detected, the synchronization system 5 notifies a transmission server of the broadcaster 50, which can then trigger the transmission of the interactive service S simultaneously with the audiovisual programme 15;

Step 7: transmission of the interactive service S and of the audiovisual programme 15 simultaneously.

The benefit to the services operator 60 of not directly recording the pictures and/or sounds to be detected is that, in order to program the synchronization, it may suffice for him to be furnished with partial information on the transmissions envisaged before that of the programmes 15.

Figure 7:
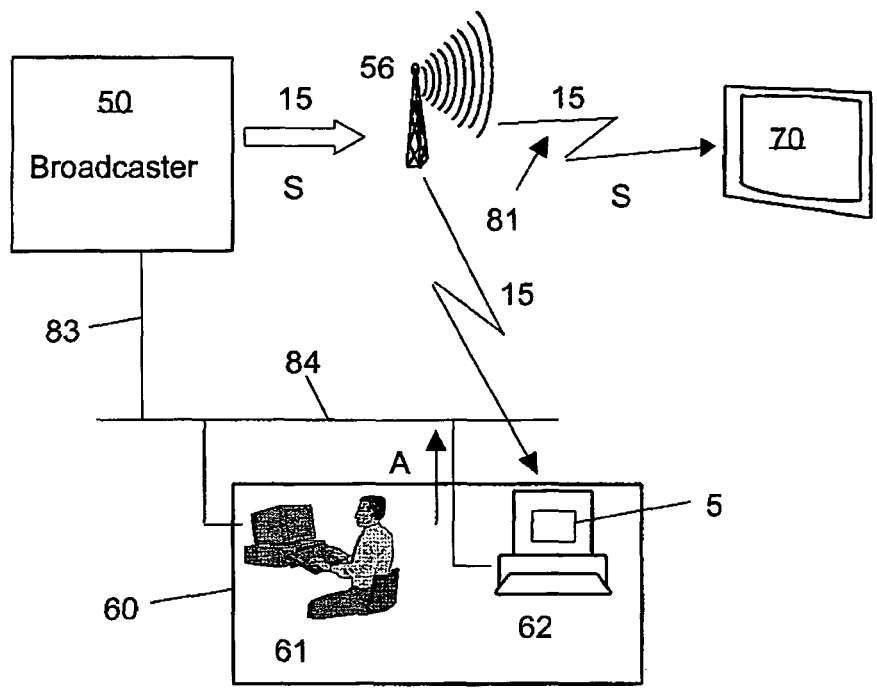
FIG. 7 shows a first mode of implementation of the synchronization system of FIG. 1 in the communication network of FIG. 5, with synchronization system at the services operator's premises.
Figure 8:
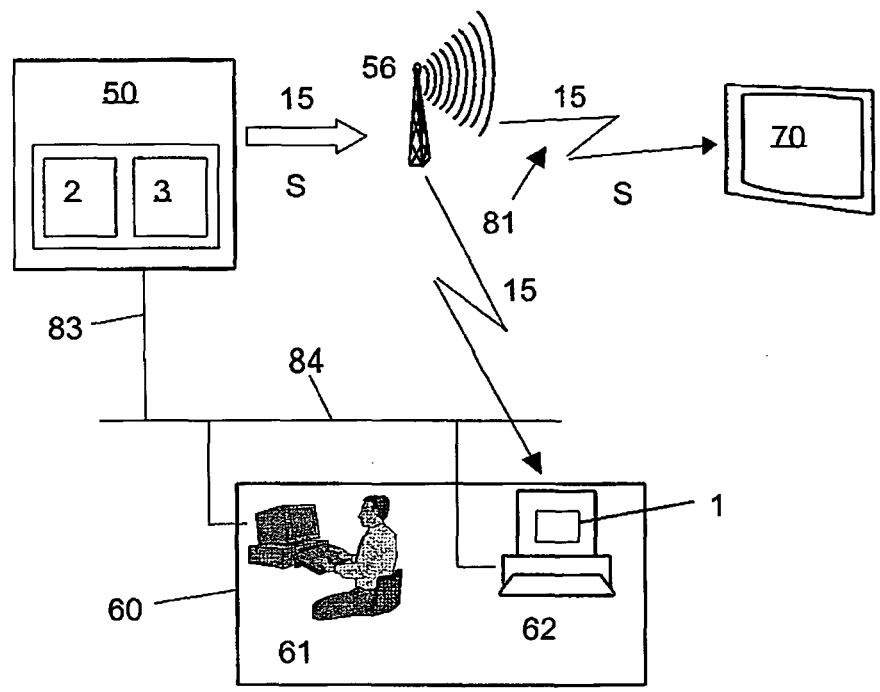
FIG. 8 shows a second mode of implementation of the synchronization system of FIG. 1 in the communication network of FIG. 5, with specification unit at the services operator's premises and recognition and activation units at the broadcaster's premises.

In a second embodiment (FIG. 8), the specification unit 1 is installed within the services operator 60, as in the first embodiment of FIG. 7, but the recognition 2 and activation 3 units are installed in the transmission server of the broadcaster 50. The course of the operational steps is for the remainder similar to that of the first embodiment.

In a third embodiment (FIG. 9), the specification unit 1 is now installed at the broadcaster 50, and the recognition 2 and activation 3 units are embedded in the terminal 70. More precisely (FIG. 10), the terminal 70 comprises a block 71 for retrieving transmitted signals (involving the operating system and drivers), which is designed to receive pairs 10 of sets of recognition elements 11 and of action identifiers 12 and interactive services S. This block 71 is designed to communicate the recognition elements 11 to the recognition unit 2, and the interactive services S to an interactivity or presentation engine 72.

While operational, the following is carried out:

Step 1: programming by an operator of the broadcaster 50 of the recognition unit 2 of the synchronization system 5, by choosing the pictures and/or sounds for the synchronization and transmission in phase advance of the recognition elements 11 (more generally: of the pair 10) comprising instructions for extracting these pictures and/or sounds from a programme previously transmitted and of the interactive service S to be executed upon detection;

Step 2: extraction and recording by the recognition unit 2 in a programme transmitted by the broadcaster 50, of the pictures and/or sounds to be detected, according to the extraction instructions included in the recognition elements 11;

Step 3: when the moment of transmitting the programme 15 has arrived, a video server or a video recorder of the broadcaster 50 commences the transmission of the audiovisual programme 15;

Step 4: transmission of the audiovisual programme 15 alone;

Step 5: the recognition unit 2 embedded in the terminal 70 then receives the audiovisual programme 15 pictures to which it has to synchronize the interactive service S and analyses them;

Step 6: when the programmed pictures and/or sounds are detected, the recognition unit 2 notifies the interactivity engine 72 via the activation unit 3, and the engine 72 can then trigger the execution of the interactive service S; in variants, the action to be triggered is the displaying or the updating of the interactive service on the terminal 70;

Step 7: appearance of the interactive service S and of the audiovisual programme 15 simultaneously.

An advantage of this third embodiment as compared with the first two is that a shift is avoided between the moment at which the audiovisual programme 15 is transmitted and the moment at which the interactive service S is inserted into the latter. However, it requires appreciable resources in the terminal 70 (CPU, memory, etc.).

According to a fourth embodiment, not represented, the synchronization system 5 is fully integrated into a terminal. The user can thus define the synchronization procedures, for example with a view to recording programmes.

In a variant embodiment, the specification unit 1 is designed to firstly allow the recognition unit 2 to acquire, several extracted portions associated respectively with one-to-one identifiers of portions. Thus, during the phase of storing each content portion in the storage space 20, the recording module 25 also stores the corresponding portion identifier. During a subsequent step of specifying a targeted detection, the specification unit 1 simply has to dispatch the portion identifiers in the recognition elements 11 of the pairs 10. These identifiers then play the role of keys making it possible to link the appearance of the extracted portions and the other parameters, such as in particular timeout lags 13 or 19 and/or actions to be triggered.

For example, the prior step of acquisition of extracted portions defines three identifiers ID1, ID2 and ID3 associated respectively with three content portions POR1, POR2 and POR3 (Table 1), then the subsequent transmission step giving instructions for synchronizing actions defines lags and actions A' and A" respectively associated with the identifiers ID2 and ID1 (Table 2).

TABLE 1

Recording of portions and of associated identifiers

| Portion identifier | Extracted portion |
|---|---|
| ID1 | POR1 |
| ID2 | POR2 |
| ID3 | POR3 |

TABLE 2

Instructions for synchronizing actions

| Portion identifier | Lag | Action |
|---|---|---|
| ID2 | 8 | A' |
| ID1 | 10 | A" |

In a particular embodiment of this variant, the detection specifications targeted may also contain detection time slots. If the recognition unit 2 detects that the current time is outside these time slots, it does not proceed to the analysis of the contents transmitted. In the converse case, the detection module is activated. Several recognition time slots may moreover overlap. For example, the identifiers ID1 and ID2 are respectively associated with a detection "Every Friday between 3 p.m. and 4 p.m." and "Every day except weekends between 12 midday and 4 p.m.".

Figure 9:
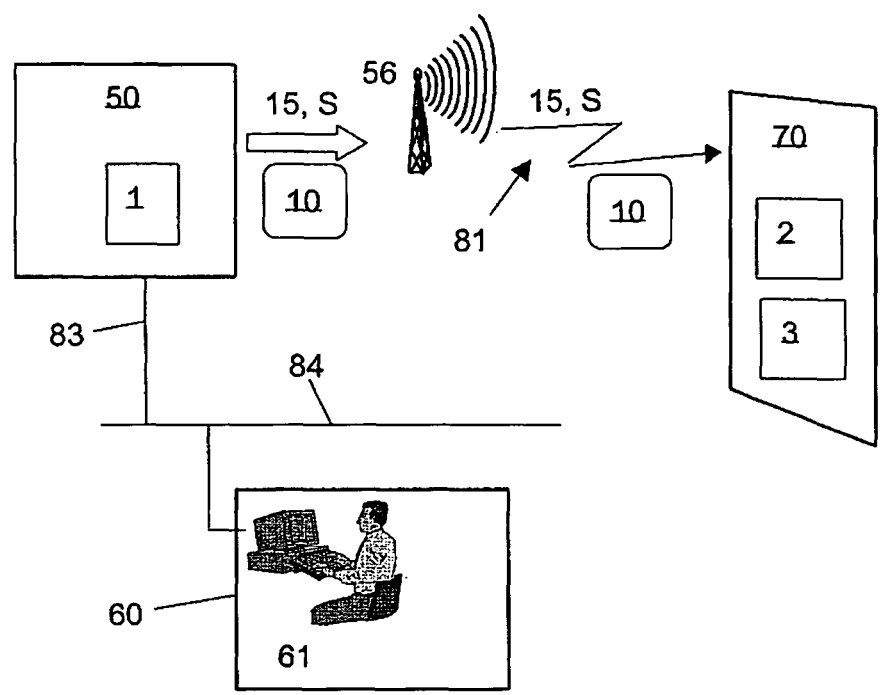
FIG. 9 shows a third mode of implementation of the synchronization system of FIG. 1 in the communication network of FIG. 5, with specification unit at the broadcaster's premises and recognition and activation units in the terminal.
Figure 10:
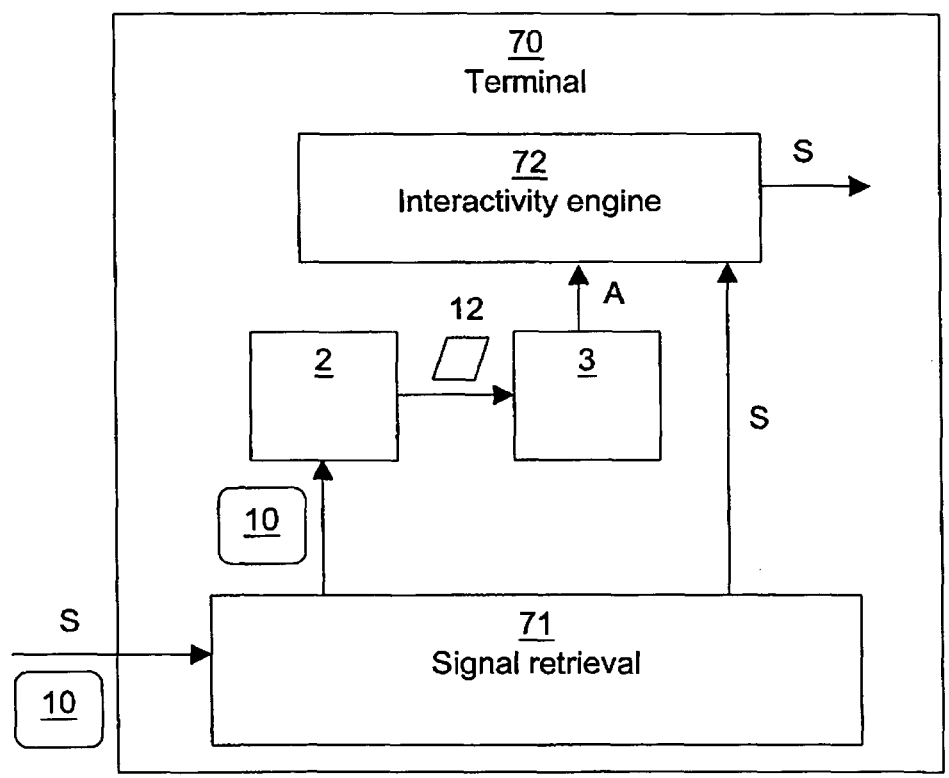
FIG. 10 represents in diagrammatic form a set-up of the recognition and activation units in the terminal, for the mode of implementation of FIG. 9.

Applications to the analogue and digital worlds of the synchronization system 5 will now be developed, respectively according to the ATVEF (standing for <<Advanced Television Enhancement Forum>>) standard and DVB standard. They pertain to the integration of the recognition 2 and activation 3 units in the terminal 70 (FIG. 9).

A/Applications to the Analogue World: ATVEF

Three main steps are distinguished:
prior indication of at least one picture to be detected; the terminal 70 must therefore acquire and save this picture;
triggering of an action or of several actions on detection of this picture during a detection period;
and indication to the terminal 70 of the end of the detection period.

A1—Indication of One or More Pictures to be Detected

According to a first example, a complete picture is detected. During the transmission of a programme, a trigger is thus despatched indicating to the terminal 70 that the current picture received should be saved for subsequent detection.

The trigger has for example the following form:

<lid://PictureStorage/Picture1>[name:"Picture1 Acquisition"]
    [PNAME = Picture1][ACQUIRE = yes]

where:
the <<PictureStorage>> field indicates to the terminal 70 that the current picture should be stored under the name <<Picture1>>;
the <<name>> field, optional, gives a description of the trigger;
the <<PNAME>> field specifies the name of the picture which will be referenced subsequently;
and the <<ACQUIRE>> field signals that the trigger should trigger the acquisition of a picture.

According to a second example, a subpart of a picture is detected. The ATVEF trigger then has for example the following form:

<lid://PictureStorage/Picture1>[name:"Picture1 Acquisition"]
    [ACQUIRE = yes] [PNAME=picture1] [tlc=25,30] [brc=150,200]

where:
the <<tlc>> (standing for <<top left corner>>) field gives the coordinates of the top left corner of a rectangle to be detected;
the <<brc>> (standing for <<bottom right corner>>) field, optional, gives the coordinates of the bottom right corner of the rectangle to be detected; if this field is absent, the bottom right corner of the picture is considered for the definition of the rectangle.

A2—Indication of the Start of the Detection Period

According to an advantageous embodiment, a specific trigger is despatched indicating to the terminal 70 that it should instigate the search for a picture previously acquired and another specific end-of-search trigger. The specification of the intended picture is done for example by referencing a picture identifier.

The trigger may then have the following form:

<lid://service_url/servicename.html>[name:"Picture1 Detection"]
    [PNAME=picture1][DETECT = yes] [tlc=25,30]

where:
the <<service_url/servicename>> field specifies an action to be triggered upon the detection of a previously acquired picture;

the <<PNAME>> field indicates the picture to be detected (picture 1);

the <<DETECT>> field signals that the trigger is designed to trigger a detection;

and the <<tlc>> field specifies the zone of the picture to be considered (top left corner).

A3—Indication of the End of the Detection Period

A trigger is despatched to the terminal 70 so as to indicate thereto that the period of detection of a picture has terminated.

In the example considered, the stoppage of the detection of the picture Picture1 thus takes effect during the receipt of the following trigger:

---
<lid://PictureStorage/Picture1>[name:"Picture 1 Stop Detection"] [PNAME=picture1] [DETECT = no]
--- where:
the <<PictureStorage>> field indicates to the terminal 70 where the picture is stored and under what name;

the <<name>> field, optional, gives a description of the trigger;

and the <<DETECT>> field specifies that the trigger is designed to trigger the stoppage of picture detection.

B/Applications to the Digital World: DVB

SI (standing for <<System Information>>) tables offer the possibility of including descriptors of events such as <<Short Events Descriptors>> (see the standard of the ETSI—standing for <<European Telecommunications Standard Institute>> —EN 300-468 V1.4.1, §6.2.33). Such a descriptor indicates the name of the event considered and gives a description thereof in text format (256 characters maximum for the type of event used here).

In general it takes the following syntactic form:

```
short_event_descriptor( )
{
descriptor_tag               // 8 bits
descriptor_length            // 8 bits
ISO 639-2 [3]_language_code  // 24 bits
event_name_length            // 8 bits or 256 characters maximum
for (i=0;i<event_name_length;
i++)
{
    event_name_char
}
text_length                  // 8 bits or 256 characters maximum
for (i=0;i<text_length;i++)
{
    text_char
}
}
``` where:
the <<descriptor_tag>> field provides an identification label; in the implementation considered, it is used to specify that one is dealing with a picture storage (<<PICTURE_STORAGE>>), a start of detection period (<<PICTURE_START_DETECTION>>) or a stoppage of detection period (<<PICTURE_STOP_DETECTION>>);

the <<descriptor_length>> field gives the length of the descriptor;

the <<language_code>> field comprises three characters indicating the code of the language (for example <<fre>>);

the <<event_name_length>> field gives the length in bytes of the name of the event;

the <<event_name_char>> field is a character string identifying the event; here it may involve picture acquisition (<<Picture1_Acquisition>>), start of detection (<<Picture1_Start_Detection>>) or end of detection (<<Picture1_Stop_Detection>>);

the (<<text_length>> field gives the length in bytes of the description of the event;

and the <<text_char>> field is a character string describing the event; in the example considered, it consists of <<PNAME=Picture1>>.

More precisely, in accordance with table 12 of the ETSI standard EN 300-468 V1.4.1, indicating that the user labels (<<tags>>) employed for the descriptor_tag field go from 0x80 to 0xFE, the correspondences indicated in table 3 are defined

TABLE 3

Values of the descriptor_tag field

| Descriptor | Value |
|---|---|
| 0x80 | PICTURE_STORAGE |
| 0x81 | PICTURE_START_DETECTION |
| 0x82 | PICTURE_STOP_DETECTION |

Examples of signalling indicating to the terminal 70 respectively that it should store a picture under the name <<Picture1>>, commence the period of detection of this picture, and halt the period of detection of this picture, are given in tables 4, 5 and 6.

TABLE 4

Signalling for picture storage

| Descriptor | Value |
|---|---|
| descriptor_tag | 0x80 |
| descriptor_length | // Sum to be calculated! |
| ISO 639-2 [3]_language_code | Fre |
| event_name_length | 20 |
| event_name_char | Picture1_Acquisition |
| text_length | 14 |
| text_char | PNAME = Picture1 |

TABLE 5

Signalling for start of detection period

| Descriptor | Value |
|---|---|
| descriptor_tag | 0x81 |
| descriptor_length | // Sum to be calculated! |
| ISO 639-2 [3]_language_code | Fre |
| event_name_length | 24 |
| event_name_char | Picture1_Start_Detection |
| text_length | 14 |
| text_char | PNAME = Picture1 |

TABLE 6

Signalling for end of detection period

| Descriptor | Value |
|---|---|
| descriptor_tag | 0x82 |
| descriptor_length | // Sum to be calculated! |

TABLE 6-continued

Signalling for end of detection period

| Descriptor | Value |
| --- | --- |
| ISO 639-2 [3]_language code | Fre |
| event_name length | 23 |
| event_name_char | Picture1_Stop_Detection |
| text_length | 14 |
| text_char | PNAME = Picture1 |

The invention claimed is:

1. Recognition unit, comprising a processor for executing instructions for recognizing audiovisual portions of audiovisual content from at least a first audiovisual programme in at least a second audiovisual programme received, said audiovisual portions serving as synchronization signals, each of said audiovisual portions of audiovisual content consisting of at least one of the following audiovisual portions: a picture, a piece of a picture, a sound and any combination of at least two of said audiovisual portions, and said at least a first audiovisual programme and said at least a second audiovisual programme, being audio and/or video, comprising an audiovisual content transmitted to users, said recognition unit comprising:

a reception module for receiving said at least a second audiovisual programme and at least a first audiovisual programme, said at least a first audiovisual programme comprising at least one audiovisual portion of audiovisual content which at least one audiovisual portion is also comprised in said at least one second audiovisual programme, said at least a first audiovisual programme being received by said reception module prior to reception of said at least a second audiovisual programme, a reception module for reception of recognition elements and a recording module for recording in a storage space, said recognition elements comprising at least one audiovisual portion of audiovisual content of said at least a first audiovisual programme which at least one audiovisual portion is also comprised in said at least a second audiovisual programme, a detection module for detecting said synchronization signals in said at least a second audiovisual programme received by means of said recognition elements stored in said storage space, by recognition in the audiovisual content of said at least a second audiovisual programme received, of said at least one audiovisual portion, extracted from the audiovisual content of said at least a first audiovisual programme, said recognition elements further comprising instructions for extraction of said at least one audiovisual portion from said at least a first audiovisual programme previously received by the reception module, which at least one audiovisual portion is also comprised in said at least a second audiovisual programme, and in that said recording module directly extracts said at least one audiovisual portion of said at least a first audiovisual programme according to said instructions and records said at least one audiovisual portion in the storage space, and a transmission module for transmitting action instructions in case of said detecting said synchronization signals in said at least a second audiovisual programme, said action instructions triggering at least one action.

2. Recognition unit according to claim 1, wherein the reception module for reception of recognition elements receives a triggering message and in that the recording module extracts and records upon receipt of said triggering message, said at least one audiovisual portion of audiovisual content of said at least a first audiovisual programme received.

3. Recognition unit according to claim 1, wherein the reception module for receiving recognition elements also receives among said recognition elements, at least one identifier of said at least one audiovisual portion, and in that said detection module retrieves from the storage space a recorded audiovisual portion associated with said identifier, so as to recognize in the audiovisual content of said second audiovisual programme said recorded audiovisual portion.

4. Recognition unit according to claim 1, wherein the reception module for receiving recognition elements also receives directly said at least one audiovisual portion among the said recognition elements and the recording module records said at least one audiovisual portion in the storage space.

5. Recognition unit according to claim 1, wherein the modules for receiving and for recording recognition elements and the module for transmitting action instructions respectively receive, record and transmit identifiers relating to the said actions to be triggered.

6. Recognition unit according to claim 1, wherein said recognition elements include at least one Boolean operator, said detection module detects at least two of said audiovisual portions of audiovisual content in conjunction with said Boolean operator and the transmission module transmits said action instructions in case of such detection.

7. Recognition unit according to claim 1, wherein said recognition elements include at least one time information item, said detection module detects said audiovisual portions of audiovisual content in conjunction with said time information item and the transmission module transmits said action instructions in case of such detection.

8. Recognition unit according to claim 7, wherein said time information item comprises at least one information item chosen from among a date of detection and a detection time slot.

9. Recognition unit according to claim 1, wherein said recognition elements include at least one channel reference, said detection module detects said audiovisual portions of audiovisual content in conjunction with said channel reference and the transmission module transmits said action instructions in the case of said detection.

10. Broadcasting centre, wherein it comprises a recognition unit in accordance with claim 1.

11. Services operator, wherein it comprises a recognition unit in accordance with claim 1.

12. Terminal, wherein it comprises a recognition unit in accordance with claim 1.

13. Specification unit comprising a processor for executing instructions for specifying audiovisual portions of audiovisual content of at least a second audiovisual programme, said audiovisual portions serving as synchronization signals associated with said at least a second audiovisual programme, each of said audiovisual portions of audiovisual content consisting of at least one of the following audiovisual portions: a picture, a piece of a picture, a sound and any combination of at least two of said audiovisual portions, and said at least a second audiovisual programme, being audio and/or video, comprising an audiovisual content transmitted to users, and said synchronization signals to be detected in said at least a second audiovisual programme transmitted via a broadcasting network and thus to trigger at least one action, wherein said specification unit comprises:

a preparation module for preparing recognition elements comprising audiovisual portions of audiovisual content of at least a first audiovisual programme which audiovisual portions are also comprised in said at least a second audiovisual programme, said at least a first audiovisual programme being transmitted prior to said at least a second audiovisual programme, and a transmission module for transmitting said recognition elements independently of transmissions of said at least a second audiovisual programme, to at least one recognition unit detecting said synchronization signals in said said at least a second audiovisual programme, by recognizing said audiovisual portion portions of audiovisual content of said at least a first audiovisual programme in the audiovisual content of said at least a second audiovisual programme, and wherein the preparation and transmission modules of said unit prepare and transmit extraction instructions, in said at least a first audiovisual programme previously received by the recognition unit via the broadcasting network, for extracting said audiovisual portion of audiovisual content, said audiovisual portion being extracted from said at least a first audiovisual programme previously received.

14. Specification unit according to claim 13, wherein the preparation and transmission modules of said unit prepare and transmit identifiers relating to said actions to be triggered in case of detection of said synchronization signals.

15. Specification unit according to claim 14, wherein said action identifiers relate to at least one of the following actions: transmission of an interactive service, triggering of an interactive service, triggering of an update of an interactive service, triggering of a recording of said audiovisual programme and connection to a website.

16. Broadcasting centre, wherein it comprises a specification unit in accordance with claim 13.

17. Services operator, wherein it comprises a specification unit in accordance with claim 13.

18. Terminal, wherein it comprises a specification unit in accordance with claim 13.

19. Synchronization system including a processor for executing instructions comprising:
- a specification unit for specifying audiovisual portions of audiovisual content of at least a second audiovisual programme, said audiovisual portions serving as synchronization signals, each of said audiovisual portions of audiovisual content consisting of at least one of the following audiovisual portions: a picture, a piece of a picture, a sound and any combination of at least two of said audiovisual portions, and said at least a second audiovisual programme, being audio and/or video, comprising an audiovisual content transmitted to users,
- a recognition unit for recognizing said synchronization signals in said at least a second audiovisual programme transmitted via a broadcasting network, by recognition of at least one audiovisual portion of audiovisual content extracted from at least a first audiovisual programme in the at least a second audiovisual programme, said at least one audiovisual portion are being comprised in said at least a second audiovisual programme, said first audiovisual programme being received prior to said at least a second audiovisual programme,
- and an activation unit triggering at least one action in the case of detection of said synchronization signals by the recognition unit, said detection being done through recognition in said at least a second audiovisual programme of said at least one audiovisual portion of audiovisual content extracted from said at least a first audiovisual programme, wherein the specification unit prepares and transmits to the recognition unit recognition elements comprising instructions for extraction of said at least one audiovisual portion of the audiovisual content said at least a first audiovisual programme, said recognition elements comprising audiovisual portions of audiovisual content of said at least a first audiovisual programme also comprised in said at least a second audiovisual programme, said audiovisual portion being extracted from said at least a first audiovisual programme, and in that the recognition unit directly extracts said audiovisual portion according to said extraction instructions and records said audiovisual portion.

20. Broadcasting centre, wherein it comprises a synchronization system in accordance with claim 19.

21. Services operator, wherein it comprises a synchronization system in accordance with claim 19.

22. Terminal, wherein it comprises a synchronization system in accordance with claim 19.

23. Process, implemented by a processor including executable instructions, for activation by recognition of audiovisual portions of audiovisual content from at least a first audiovisual programme in at least a second audiovisual programme, said audiovisual portions serving as synchronization signals, each of said audiovisual portions of audiovisual content consisting of at least one of the following audiovisual portions: a picture, a piece of a picture, a sound and any combination of at least two of said audiovisual portions, and said at least a first audiovisual programme and said at least a second audiovisual programme, being audio and/or video, comprising an audiovisual content broadcast to users, said process comprising the following steps:
- reception via a broadcasting network, of said at least a second audiovisual programme, and of said at least a first audiovisual programme, said at least a first audiovisual programme being received prior to reception of said at least a second audiovisual programme, and said at least a first audiovisual programme comprising at least a portion of audiovisual content that is also comprised in said at least a second audiovisual programme,
- detection of said synchronization signals in said at least a second audiovisual programme by means of recognition elements stored in a storage space, by recognition of said extracted audiovisual portion extracted from said at least a first audiovisual programme in the audiovisual content of said at least a second audiovisual programme, said recognition elements including audiovisual portions of audiovisual content,
- and triggering of at least one action in case of detection of the said synchronization signals in said at least a second audiovisual programme,
- wherein said recognition elements further comprise instructions for extraction of said at least one audiovisual portion from said at least a first audiovisual programme, said at least one audiovisual portion is extracted directly according to said extraction instructions and said at least one audiovisual portion is recorded in the storage space,
- said process of activation being implemented by means of a recognition unit and an activation unit.

24. Specification process, implemented by a processor including executable instructions, of specifying audiovisual portions of audiovisual content of at least a second audiovisual programme, said audiovisual portions serving as synchronization signals associated with said at least a second audiovisual programme, each of said audiovisual portions of audiovisual content consisting of at least one of the following audiovisual portions: a picture, a piece of a picture, a sound and any combination of at least two of said audiovisual portions, and said at least a second audiovisual programme, being audio and/or video, comprising an audiovisual content transmitted to users, and said synchronization signals being detected in said at least a second audiovisual programme that is transmitted via a broadcasting network and thus triggering at least one action, wherein said specification process comprises the following steps:

preparation of recognition elements comprising audiovisual portions of audiovisual content of a first audiovisual programme which audiovisual portions are also comprised in said second audiovisual programme, said first audiovisual programme being transmitted prior to said second audiovisual programme, transmission of said recognition elements independently of transmissions of said at least a second audiovisual programme, for detection of said synchronization signals in said at least a second audiovisual programme, by recognizing said audiovisual portions of audiovisual content of said at least a first audiovisual programme in the audiovisual content of said at least a second audiovisual programme, and transmission of extraction instructions, in said at least a first audiovisual programme, for extracting said audiovisual portion of audiovisual content, by extracting said audiovisual portion from said at least a first audiovisual programme, said specification process being implemented by means of a specification unit.

25. Synchronization process, implemented by a processor including executable instructions, comprising the following steps:

a step of specifying audiovisual portions of audiovisual content of at least a second audiovisual programme, said audiovisual portions serving as synchronization signals associated with said at least a second audiovisual programme, each of said audiovisual portions of audiovisual content consisting of at least one of the following audiovisual portions: a picture, a piece of a picture, a sound and any combination of at least two of said audiovisual portions, and said at least a second audiovisual programme, being audio and/or video, comprising an audiovisual content transmitted to users, in which step recognition elements are specified for said detection, said recognition elements including audiovisual portions of audiovisual content which at least one audiovisual portion is also comprised in said at least one second audiovisual programme, said at least a first audiovisual programme being transmitted prior to transmission of said at least a second audiovisual programme, a step of detecting said synchronization signals in said at least a second audiovisual programme, in which step said synchronization signals are detected in said at least a second audiovisual programme, by recognizing said audiovisual portion in the audiovisual content of said at least a second audiovisual programme, and a step of triggering at least one action in case of detection of said synchronization signals, wherein said recognition elements that further comprise instructions for extracting said audiovisual portion of audiovisual content from a said at least a first audiovisual programme previously transmitted to the recognition unit via the broadcasting network, are prepared and transmitted to the recognition unit, and wherein said audiovisual portion is extracted directly according to said extraction instructions and said audiovisual portion is recorded, said synchronization process being implemented by a synchronization system.

26. A computer readable non-transitory storage medium encoded with a computer program comprising the steps of:

receiving via a broadcasting network, of at least a first audiovisual programme and at least a second audiovisual programme, being audio and/or video, comprising an audiovisual content broadcast to users, and said at least a first audiovisual programme comprising audiovisual portions of content which that are also comprised in said at least one second audiovisual programme, and said at least a first audiovisual programme being received prior to reception of said at least a second audiovisual programme, detection of audiovisual portions of audiovisual content in said at least a second audiovisual programme, said audiovisual portions serving as synchronization signals in said at least a second audiovisual programme, each of said audiovisual portions of audiovisual content consisting of at least one of the following audiovisual portions: a picture, a piece of a picture, a sound and any combination of at least two of said audiovisual portions, and said detection being done by means of recognition elements extracted from said at least a first audiovisual programme and stored in a storage space, by recognition of said extracted audiovisual portion, in the audiovisual content of said at least a second audiovisual programme, said recognition elements being audiovisual portions of audiovisual content extracted from said at least a first audiovisual programme, and triggering of at least one action in case of detection of the said synchronization signals in said at least a second audiovisual programme, wherein said recognition elements further comprise instructions for extracting said audiovisual portion from said at least a first audiovisual programme, said audiovisual portion of said at least a first audiovisual programme is extracted directly according to said extraction instructions and said audiovisual portion is recorded in the storage space.

27. A computer readable non-transitory storage medium encoded with a computer program comprising the steps of:

preparation of recognition elements comprising at least one audiovisual portion of audiovisual content of extracted from at least a first audiovisual programme which at least one audiovisual portion of audiovisual content is also present in at least a second audiovisual programme, said at least a first audiovisual programme being transmitted prior to transmission of said at least a second programme, each of said at least one audiovisual portion of audiovisual content consisting of at least one of the following audiovisual portions: a picture, a piece of a picture, a sound and any combination of at least two of said audiovisual portions, and said at least a first audiovisual programme and said at least a second audiovisual programme, being audio and/or video, comprising an audiovisual content transmitted to users, said recognition elements comprising audiovisual portions of audiovisual content of at least a first audiovisual programme which audiovisual portions are also comprised in said at least a second audiovisual programme, transmission of said recognition elements independently of transmissions of said at least a second audiovisual programme, for detection of audiovisual portions of audiovisual content of said at least a second audiovisual programme, said audiovisual portions serving as synchronization signals in said at least a second audiovisual programme, by recognizing said audiovisual portions in the audiovisual content of said at least a second audiovisual programme, and transmission of extraction instructions, in said at least a first audiovisual programme previously received by the recognition unit for extracting said audiovisual portions of audiovisual content, by extracting said audiovisual portions from said at least a first audiovisual programme previously received.

28. A computer readable non-transitory storage medium encoded with a computer program comprising the steps of:

a step of specifying audiovisual portions of audiovisual content of at least a second audiovisual programme, said portions serving as synchronization signals associated with said at least a second audiovisual programme, each of said audiovisual portions of audiovisual content consisting of at least one of the following audiovisual portions: a picture, a piece of a picture, a sound and any combination of at least two of said audiovisual portions, and said at least a second audiovisual programme, being audio and/or video, comprising an audiovisual content transmitted to users, in which step recognition elements that comprise at least one audiovisual portion of the audiovisual content of said at least a second audiovisual programme are specified for detection, said recognition elements comprising audiovisual portions of audiovisual content of a first audiovisual programme which audiovisual portions are also comprised in said at least a second audiovisual programme, said at least a first audiovisual programme being received prior to said at least a second audiovisual programme, a step of detecting said synchronization signals in said at least a second audiovisual programme, in which synchronization step said synchronization signals are detected in said at least a second audiovisual programme, by recognizing said audiovisual portions of audiovisual content of said at least a first audiovisual programme in the audiovisual content of said at least a second audiovisual programme, and a step of triggering at least one action in case of detection of said synchronization signals, wherein said recognition elements further comprise instructions for extracting said audiovisual portions of audiovisual content from said at least a first audiovisual programme previously received by the recognition unit, by extracting said audiovisual portions from said at least a first programme, are prepared and transmitted to the recognition unit, and wherein said audiovisual portions are extracted directly according to said extraction instructions and said audiovisual portions are recorded.

* * * * *